(12) United States Patent
Marsden et al.

(10) Patent No.: US 8,383,177 B2
(45) Date of Patent: Feb. 26, 2013

(54) METHOD AND SYSTEM FOR REDUCING PATHOGENS

(75) Inventors: James L. Marsden, Manhattan, KS (US); Marie Moody, New Berlin, WI (US)

(73) Assignee: Stella & Chewys, LLC, Muskego, WI (US)

(*) Notice: Subject to any disclaimer, the term of this patent is extended or adjusted under 35 U.S.C. 154(b) by 584 days.

(21) Appl. No.: 12/502,298

(22) Filed: Jul. 14, 2009

(65) Prior Publication Data

US 2010/0034936 A1 Feb. 11, 2010

Related U.S. Application Data

(60) Provisional application No. 61/087,223, filed on Aug. 8, 2008.

(51) Int. Cl.
*A21D 6/00* (2006.01)

(52) U.S. Cl. ........ 426/237; 426/235; 426/392; 426/399; 426/521

(58) Field of Classification Search .................. 426/235, 426/236, 237, 392, 399, 407, 521; 99/451
See application file for complete search history.

(56) References Cited

U.S. PATENT DOCUMENTS

| | | | | |
|---|---|---|---|---|
| 3,705,813 | A | * | 12/1972 | Vogel ................................. 426/2 |
| 4,349,575 | A | | 9/1982 | Roth |
| 6,605,308 | B2 | | 8/2003 | Shane et al. |
| 6,635,223 | B2 | | 10/2003 | Maerz |
| 6,964,787 | B2 | | 11/2005 | Swart et al. |
| 6,964,788 | B2 | * | 11/2005 | Phebus et al. ................. 426/335 |
| 7,169,415 | B2 | | 1/2007 | Bowling et al. |
| 2002/0086099 | A1 | * | 7/2002 | Shim et al. ..................... 426/615 |
| 2003/0165601 | A1 | | 9/2003 | Terry |
| 2004/0058041 | A1 | * | 3/2004 | Greenwald ..................... 426/321 |
| 2004/0101604 | A1 | * | 5/2004 | Granly Koch et al. ........ 426/335 |
| 2006/0024414 | A1 | | 2/2006 | Turek et al. |
| 2007/0020366 | A1 | | 1/2007 | Luchansky et al. |
| 2007/0054008 | A1 | | 3/2007 | Clayton et al. |

FOREIGN PATENT DOCUMENTS

WO WO9509544 4/1995

OTHER PUBLICATIONS

"An RGF Commercial Grade Ionized Advanced Oxidation Technoloy, REME+, Reflective Electro-Magnetic Energy," http://rgf.com/documents/REME_web_doc.pdf, pp. 1-5.

Lauran Neergaard, "Putting the squeeze on produce to kill germs," MiamiHerald.com, posted on Mon., Jul. 28, 2008, pp. 1-2.

Ronald G. Fink, "RGF's Advanced Oxidation Technology," http://www.bobsheating.com/PDF/AOT_book.pdf, pp. 1-36.

* cited by examiner

*Primary Examiner* — Drew Becker
*Assistant Examiner* — Preston Smith
(74) *Attorney, Agent, or Firm* — Joseph R. Englander; Shutts & Bowen, LLP

(57) ABSTRACT

A method and system is provided whereby pathogens in food are reduced by first sealing food in a package and then applying high hydrostatic pressure to the sealed package. The package is moved to a clean area having pathogen-reducing treatment such as a cleansing plasma. The food is removed from the sealed package and then transferred to a food processor such as a grinder or dicer having internal pathogen reducing treatment. The food may then be transferred to a patty maker having internal cleansing plasma. The food may then be transferred to a freezer or freeze dryer having internal cleansing plasma.

10 Claims, 4 Drawing Sheets

US 8,383,177 B2

METHOD AND SYSTEM FOR REDUCING PATHOGENS

CROSS-REFERENCE TO RELATED APPLICATION

This application relates to the same subject matter as co-pending provisional patent application Ser. No. 61/087,223, filed by the same applicant on Aug. 8, 2008. This application claims the Aug. 8, 2008 filing date as to the common subject matter.

BACKGROUND OF THE INVENTION

1. Field of Invention

The present invention relates to the pathogen reducing arts. It applies particularly to microbial decontamination of uncooked food product, and will be described with particular reference thereto.

2. Background

Prevention of food poisoning is of paramount importance in the food processing industry, whether for human consumption or for pet consumption. Concern for food safety has lead most countries to regulate the food industry heavily to minimize public health risks. Despite these efforts, food poisoning still occurs in humans and in pets. Many instances of food poisoning are attributed to bacteria, such as *Salmonella, Clostridium*, and *Staphylococcus*, among others. Furthermore, recent failures in food safety protocol in pet food processing plants in China resulted in the unnecessary food poisoning of hundreds of animals.

Application of heat to the food is commonly used to reduce pathogens in food. However, heat can damage food. Also, certain pets may not be able to obtain the proper nutrition from cooked foods. Also, flavor and texture may be altered through the application of heat.

An alternative to heat treatment is the use of antimicrobial ingredients, such as potassium sorbate, propionates, or benzoates are often added to foods to protect against microbial spoilage. However these compounds adversely affect the flavor of products. Furthermore, the long term effect of these compounds on humans and animals is not entirely known.

High pressure processing (HPP) has been investigated as a method for preservation of foods. In such processing, high hydrostatic pressure without thermal treatment is applied to a food product to reduce its microbial load. For example, U.S. Pat. No. 6,635,223 discloses methods for inactivating microorganisms in products packed in a flexible container using high pressure (500 to 8000 bar). Similarly, the published U.S. patent application of Turek et al. having Ser. No. 10/903,016 discloses a method of reducing pathogens using high pressure treatment of food product of approximately 300 MPa. Sufficiently high pressure conditions may destabilize the cell membranes of food borne illness causing microorganisms, thereby reducing their survivability and activity without causing damage to the food. Thus, HPP allows the pathogens to be reduced without there being any heat or chemical related changes to the food.

Furthermore, additional processing may be required for the food product which may have the possibility of subjecting food to pathogens after high pressure treatment. For example, dicing or grinding may be needed for optimal texture of the end product.

It would therefore be desirable to enhance the effectiveness of high pressure treatment of food by using additional means for reducing pathogens that do not cook or chemically treat the food.

There remains a need for a method for the reduction of pathogens in food for humans or animals that does not heat or chemically treat the food. The present invention fulfills this objective, as well as other needs and objectives, as will be apparent from the following description of the present invention.

SUMMARY OF THE INVENTION

In accordance with one aspect of the invention, a method for reducing pathogens in human or animal food is provided. The method includes the steps of sealing the food in a sealed package, applying hydrostatic pressure to the sealed package, and moving the package to an area having pathogen reducing treatment such as a cleansing plasma created through photohydroionization, or "PHI". Photohydroionization may be accomplished by PHI cells manufactured by RGF Environmental Group, Inc.

In accordance with another aspect of the invention, after the package is moved to an area having pathogen reducing treatment, the following steps occur: removing the food from the package, transferring the food to a grinder having internal pathogen reducing treatment (such as PHI), transferring the food to a forming mechanism (such as a patty maker) having internal pathogen reducing treatment (such as PHI), transferring the food to a freezer or freeze dryer having internal pathogen treatment (such a PHI), and packaging the food.

In accordance with yet another aspect of the invention, after the package is moved to an area having pathogen reducing treatment, the following steps occur: transferring the food to a grinder having internal pathogen reducing treatment (such as through PHI using a PHI cell or a Reflective Electromagnetic Energy "REME" unit), transferring the food to a freeze dryer having internal pathogen reducing treatment (such as PHI), and packaging the food.

The present invention provides for a new and improved system and process for treating food products which overcomes the above-referenced problems and others.

One advantage of the present invention is that the food product has reduced pathogenic bacteria.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
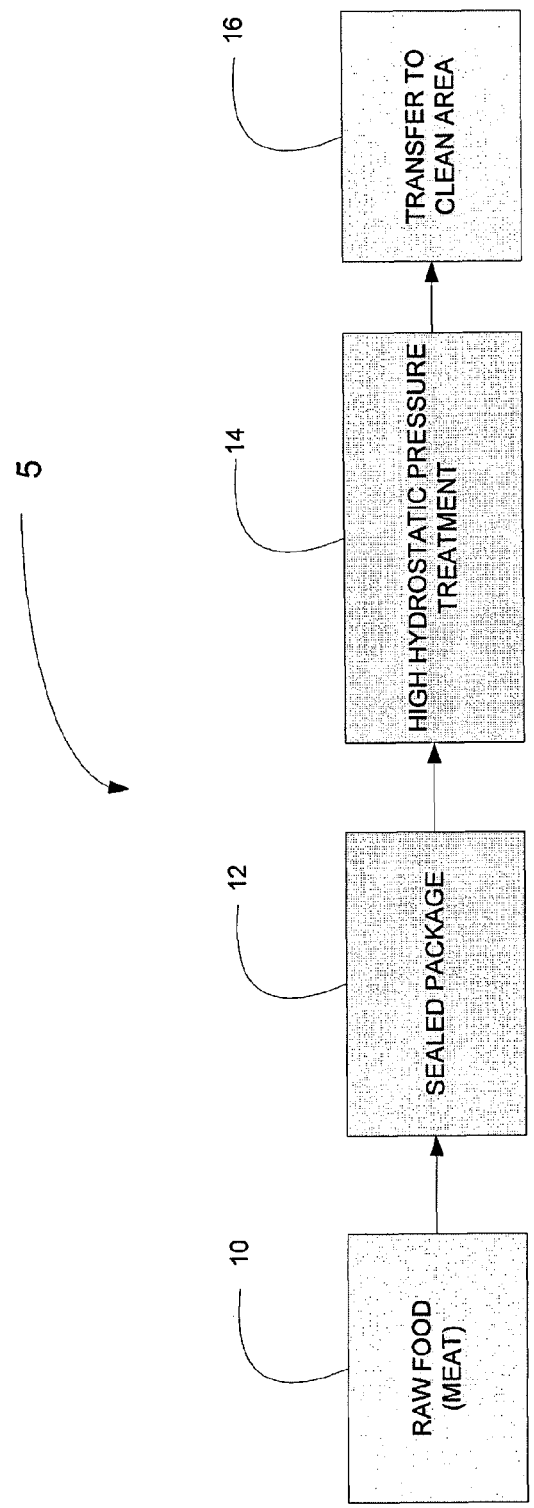
FIG. 1 is a flow diagram of a method for reducing pathogens.

With reference to FIG. 1, a method for reducing pathogens in raw human and animal food is shown as element 5. Raw food 10 such as food containing meat is placed in a package 12, which is then sealed. The raw food 10 may be placed in a bag made of food grade plastic, such as multi-layer nylon-metalocene-polyester, or the equivalent in the market. The package 12 may be sealed by heat sealing a seam of a bag containing the food or by an equivalent method. The package 12 is then subjected to high hydrostatic pressure treatment 14. High hydrostatic treatment may be pressure treatment using a high pressure food press such as one manufactured by NC Hyperbaric, Elmhurst Systems, Engineered Pressure Systems, Inc., Avure, Stansted Fluid Power or Uhde-Hockdrucktechnik.

The package is then brought to a hydrostatic pressure of approximately 300 to 8,000 bar. After the high hydrostatic pressure treatment 14, the sealed, pressure treated package 12 is transferred to a clean area 16 for further processing. The further processing may include placing the food on a conveyor or in a food processor, such as a grinder or dicer. The clean area 16 may include within its boundaries one or more apparatuses for cleansing the air in the clean area 16 and cleansing the surfaces of the clean area 16, such as one or more apparatuses that provides a cleansing plasma. In one embodiment, the apparatus uses photohydroionization (PHI) for forming cleansing plasmas. PHI may be created using PHI cells manufactured by RGF Environmental Group, Inc. or other methods known in the art. The one or more apparatuses may be located in the ventilation system of the clean area 16, on the walls or ceiling of the clean area 16 or anywhere within the clean area 16 where the cleansing plasma may help reduce pathogens within the clean area 16. Additional cleansing techniques for the clean area 16 known in the art are also considered.

Figure 2:
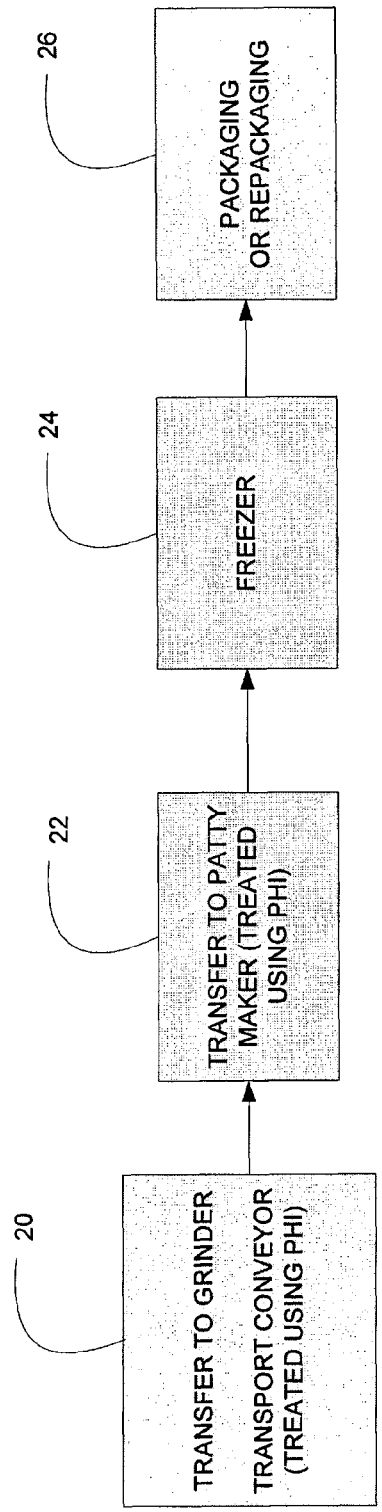
FIG. 2 is a flow diagram of an aspect of a method for reducing pathogens.

In one embodiment of the invention, shown in FIG. 2, once the sealed package 12 is in the clean area 16 for processing, the food is then removed from the sealed package 12 and transferred to a grinder 20. In another embodiment of the invention, the food is moved to and/or from the grinder 20 by a transport conveyor. The grinder 20, the conveyors (if used), or both, may include an internal apparatus for reducing pathogens using a cleansing plasma, such as one including a PHI cell. The internal apparatus may be located so that the cleansing plasma contacts the surface of the grinder 20 and/or conveyors which contact the food.

For further processing after grinding, it may be desired for the food to be transferred to a forming apparatus 22, such as a patty maker. The forming apparatus may also include a second apparatus using a cleansing plasma, such as a PHI cell. The second cleansing apparatus may be located so that the cleansing plasma contacts the surface of the forming apparatus which contacts the food.

From the forming apparatus, the food may be placed in a freezer 24 in the clean area 16 and then packaged or repackaged 26 in the clean area 16. Alternatively, the food may be packaged 26 without going through the freezer 24. After packaging 26, the packaged food may be taken from the clean area 16.

Figure 3:
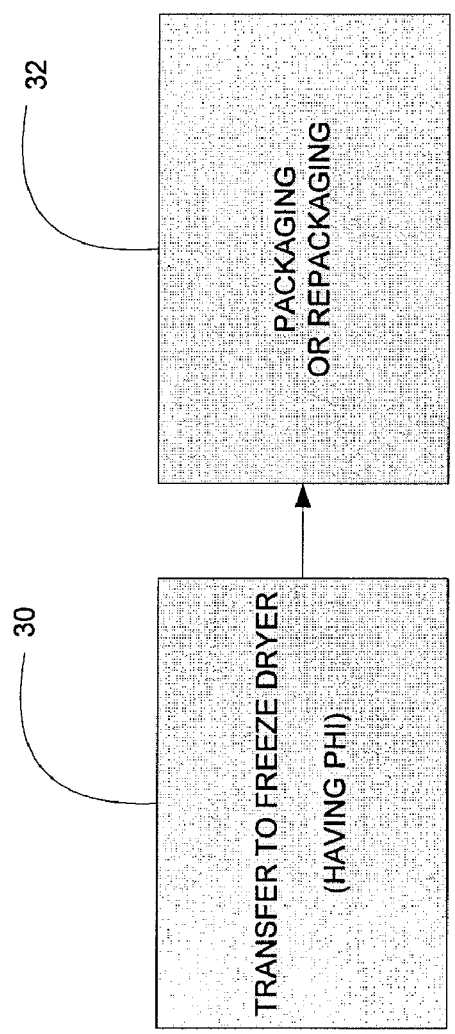
FIG. 3 is a flow diagram of another aspect of a method for reducing pathogens.

In an alternative embodiment, shown in FIG. 3, after the food has been transferred to a grinder 20, the food may then be transferred to a freeze dryer 30. The freeze dryer 30 may be located within the clean area 16. Alternatively, the freeze dryer 30 may include a third apparatus for reducing pathogens using a cleansing plasma, such as a PHI cell. The third apparatus may be located on the freeze dryer 30 so that the cleansing plasma touches the surface of the freeze dryer 30 that comes into contact with the food. The food would then be packaged 32 or re-packaged for distribution. After packaging 32, the packaged food would be taken from the clean area 16.

Figure 4:
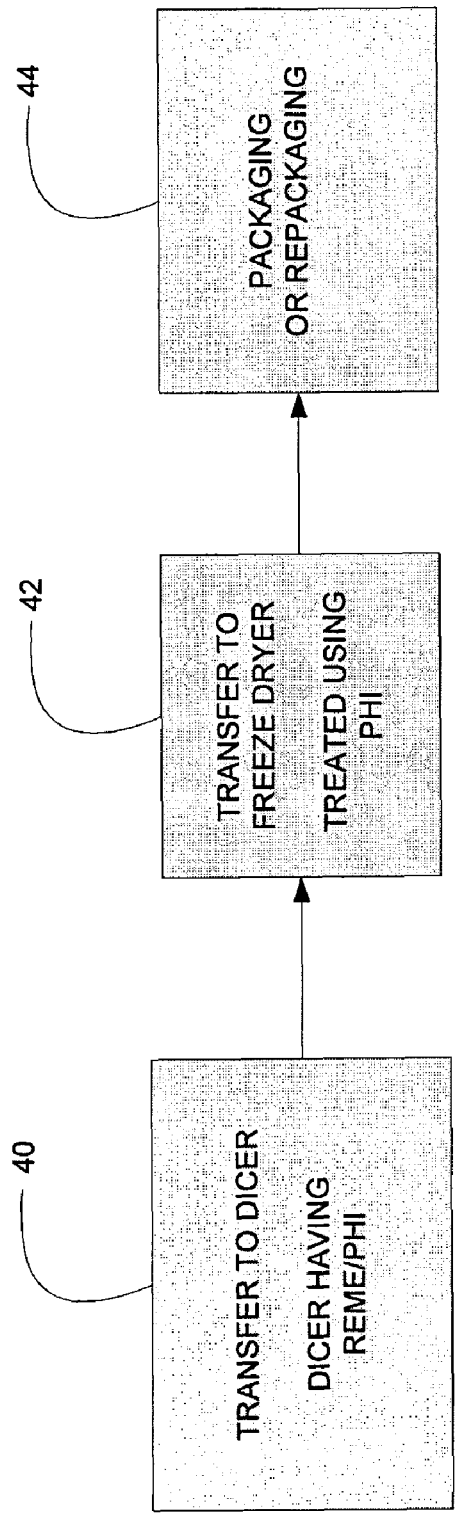
FIG. 4 is a flow diagram of another aspect of a method for reducing pathogens.

In an alternative embodiment, it may be desired that the food is diced. As shown in FIG. 4, the food would be transferred to a dicer 40 rather than the grinder 20 (FIG. 2). After the packaged, high hydrostatic pressure treated food is placed in the clean area 16, the food is taken from its packaging and put through a dicer 40. The dicer 40 may include an internal cleansing apparatus using a cleansing plasma, such as a PHI cell or a REME apparatus produced by RGF Environmental Group, Inc. The cleansing apparatus is placed on or near the dicer 40 so that the cleansing plasma touches the surface of the dicer 40 which comes into contact with the food. The food is then transferred to a freeze dryer 42. The freeze dryer 42 also may include an internal apparatus using a cleansing plasma, such as a PHI cell. From the freeze dryer 42, the food is then packaged or re-packaged 44 for distribution.

To maintain the food in a decontaminated state, the clean area 16 is maintained at a high level of disinfection/sterilization. This may be achieved in a number of ways. Preferably all of the following steps are taken, although it will be appreciated that in some instances, it will not be possible to achieve all the steps.

The air inside the clean area 16 may additionally be sterilized/disinfected by passing through a filter, such as a HEPA filter. Recirculation of the air through the filter and the cleansing plasma ensures that any airborne pathogens are quickly removed.

Furthermore, the clean area 16 may comprise several clean areas, which are linked by passages. All of the smaller clean areas and passages between them are preferred to be maintained to the clean area conditions. A number of smaller clean areas may be preferable to one large room, each with its own cleansing system, since it may be easier to regulate the environment of smaller areas.

It will be appreciated by persons skilled in the art that the present invention is not limited to what has been particularly shown and described herein above. In addition, unless mention was made above to the contrary, it should be noted that the accompanying drawings are not to scale. A variety of modifications and variations are possible in light of the above teachings without departing from the scope and spirit of the invention.

What is claimed is:

1. A method for reducing pathogens in raw human and animal food, comprising the steps of:
   placing raw food in a package;
   sealing the package;
   treating the package with high hydrostatic pressure;
   placing the package in a clean area; and
   opening the package for further processing
   further comprising the step of placing the food from the open package in a food processor located in the clean area wherein the food processor has a surface for contacting the food
   wherein the food processor includes a food processor cleansing plasma apparatus, and
   wherein the cleansing plasma of the food processor cleansing plasma apparatus is in contact with the surface for contacting food of the food processor.

2. The method of claim 1, wherein the clean area comprises an apparatus for providing a cleansing plasma.

3. The method of claim 2, wherein the apparatus comprises a PHI cell.

4. The method of claim 1, wherein the food processor is a grinder.

5. The method of claim 1, further comprising the step of placing the food on a conveyor.

6. The method of claim 5, wherein the conveyor includes a third apparatus for providing a cleansing plasma, wherein the cleansing plasma of the third apparatus is in contact with the surface of the food.

7. The method of claim 1, wherein the food processor is a dicer.

8. The method of claim 7, further comprising the step of placing the food in a freeze dryer located within the clean area.

9. The method of claim 8, wherein the freeze dryer includes a fourth apparatus for providing a cleansing plasma.

10. The method of claim 9, wherein the cleansing plasma of the fourth apparatus is in contact with the surface of the food.

* * * * *